(12) United States Patent
Seo

(10) Patent No.: US 7,011,230 B2
(45) Date of Patent: Mar. 14, 2006

(54) STARSTICKER VENDING MACHINE AND ITS INFORMATION UPDATING METHOD

(76) Inventor: Young Hyun Seo, 728-2, Shinaml-dong, Dong-gu, Daegu (KR)

(*) Notice: Subject to any disclaimer, the term of this patent is extended or adjusted under 35 U.S.C. 154(b) by 289 days.

(21) Appl. No.: 10/474,845

(22) PCT Filed: Apr. 18, 2002

(86) PCT No.: PCT/KR02/00708

§ 371 (c)(1),
(2), (4) Date: Oct. 15, 2003

(87) PCT Pub. No.: WO02/086828

PCT Pub. Date: Oct. 31, 2002

(65) Prior Publication Data

US 2004/0133302 A1 Jul. 8, 2004

(30) Foreign Application Priority Data

Apr. 21, 2001 (KR) ............................... 2001-21623

(51) Int. Cl.
*B65G 59/00* (2006.01)
(52) U.S. Cl. .......................................... 221/1; 700/213
(58) Field of Classification Search .................... 221/1, 221/2, 7, 9, 13; 700/213
See application file for complete search history.

(56) References Cited

FOREIGN PATENT DOCUMENTS

| KR | 20-2001-213649 Y | 2/2001 |
|---|---|---|
| KR | 10-2002-36116 A | 5/2002 |

*Primary Examiner*—Kenneth Noland
(74) *Attorney, Agent, or Firm*—Birch, Stewart, Kolasch & Birch, LLP

(57) ABSTRACT

An automatic star sticker vending machine and a method for updating information thereof, wherein a newest image (photograph) and newest information of a star (an animation character, celebrity, popular person, performer, notable figure or the like) desired by a user are provided in real time and outputted in the form of a sticker directly without being synthesized, or after being synthesized according to the user's tastes. Star images in the star sticker vending machine are updated with newest ones in real time over the Internet such that the user synthesizes a newest image (photograph file) of his/her favorite star, his/her image (photograph) and a desired image and outputs the synthesized result in the form of a sticker or downloads and stores it into a storage medium in the form of a file. Therefore, the user's various desires can be met and the user can be more familiar with the favorite star.

8 Claims, 7 Drawing Sheets

STARSTICKER VENDING MACHINE AND ITS INFORMATION UPDATING METHOD

This application is the national phase under 35 U.S.C. §371 of PCT International Application No. PCT/KR02/00708 which has an International filing date of Apr. 18, 2002, which designated the United States of America.

TECHNICAL FIELD

The present invention relates to an automatic star sticker vending machine and a method for updating information thereof, wherein a newest image (photograph) and newest information of a star (an animation character, celebrity, popular person, performer, notable figure or the like) desired by a user are provided in real time and outputted in the form of a sticker directly without being synthesized, or after being synthesized according to the user's tastes, and more particularly to an automatic star sticker vending machine and a method for updating information thereof, wherein star images in the star sticker vending machine are updated with newest ones in real time over the Internet such that a user synthesizes a newest image (photograph file) of his/her favorite star, his/her image (photograph) and a desired image and outputs the synthesized result in the form of a sticker or downloads and stores it into a storage medium in the form of a file, thereby enabling a variety of desires of the user to be met and the user (fan) to be more familiar with the favorite star.

BACKGROUND ART

With the advance of information technologies, the Internet industry becomes more widespread day by day. A great number of host computers are connected to the Internet every day to play a decisive role in making the whole world into one global village.

The World Wide Web also makes a great contribution to the integration of the whole world into one global village in that it helps ordinary persons to easily access and use the Internet through personal computers and multimedia functions.

The development of the World Wide Web has rapidly switched over to commercial use. Electronic commerce is a representative example of using the Internet commercially.

Recently, electronic commerce has rapidly spread to financial institutions, such as banks, securities companies and others. Provided over the Internet are a variety of services, for example, the provision of map data (or geographical data) from a geographical information system, the provision of various electronic advertisements (banner advertisements) in a moving image form or still image form, an Internet phone service, an Internet TV service, an Internet facsimile service, etc. These services make a great contribution to the popularization of the Internet and an increase in Internet using population.

On the other hand, conventional automatic sticker vending machines have a disadvantage in that they can output nothing but photographs of users. One such conventional automatic sticker vending machine comprises a digital camera for picking up an image in front thereof, an image processor for processing the image picked up by the digital camera, and an output device for outputting the image processed by the image processor to the surface of a sticker in a color printing manner. A user takes his/her own image (photograph) by the digital camera installed in the sticker vending machine and outputs the taken image in the form of a sticker, or synthesizes it with a previously edited image and outputs the synthesized result in the form of a sticker.

That is, the above-mentioned conventional automatic sticker vending machine is desirable in that it can edit sticker contents using some edit data stored in its internal memory, but has a disadvantage in that it cannot update the edit data with newest data because it has no separate communication means.

As a result, the above conventional sticker vending machine cannot update the existing sticker data with up-to-date data or newest ones of images (photographs) and information of stars varying widely in their popularity at proper times, so it cannot meet users' expectations, resulting in a reduction in utilization.

DISCLOSURE OF THE INVENTION

Therefore, the present invention has been made in view of the above problems, and it is an object of the present invention to provide a method for updating information of an automatic star sticker vending machine which includes a network connected to a star (an animation character, celebrity, popular person, performer, notable figure or the like) sticker site, comprising the steps of allowing a user to gain access to and log in to the star sticker site using the sticker vending machine and/or a client system, allowing the user to select a desired real-time-updated star image photograph from the star sticker site, and outputting the selected star image photograph in the form of a sticker.

The information updating method further comprises the steps of taking an image photograph of the user by a digital camera before the output of the selected star image photograph to the sticker, and synthesizing the star image photograph with the user image photograph.

Moreover, the information updating method can output a star sticker under a pay condition. Alternatively, in the case where a star sticker is outputted free, the information updating method may further comprise the step of inserting an advertisement in a portion of the star sticker.

In accordance with one aspect of the present invention, the above and other objects can be accomplished by the provision of a method for updating images (photographs) and information of stars (celebrities, animation characters and the like) in an automatic star sticker vending machine with newest ones in real time over the Internet and outputting a newest star image desired by a user in the form of a sticker in a synthesis or non-synthesis manner through the sticker vending machine.

In accordance with another aspect of the present invention, there is provided a method for updating information of an automatic star sticker vending machine which includes a network connected to a star sticker site, comprising the steps of allowing a user to gain access to and log in to the star sticker site using the sticker vending machine and/or a client system, allowing the user to select a desired real-time-updated star image photograph from the star sticker site, and outputting the selected star image photograph in the form of a sticker.

The information updating method may further comprise the steps of taking an image photograph of the user by a digital camera (PC camera) before the output of the selected star image photograph to the sticker, and synthesizing the star image photograph with the user image photograph.

Preferably, the information updating method may output a star sticker under either a pay or free condition. In the case where a star sticker is outputted free, the information updating method may further comprise the step of inserting an advertisement in a portion of the star sticker.

In a feature of the present invention, there is provided a star sticker information updating method which provides a chain for securely linking stars to users and enabling each user to be more familiar with his/her favorite star.

In another feature, there is provided an automatic star sticker vending machine based on the star sticker information updating method.

In a further feature, companies or private advertisers can insert and edit their advertisements in star stickers desired by users and output the resulting star stickers, so as to have advertising effects capable of more easily informing the users of their images.

In yet another feature, a predetermined number of star stickers can be issued free in compensation for insertion of advertisements of companies or individuals therein. After the predetermined number of star stickers are issued free, new star stickers can be issued only when a predetermined amount of money is paid. Therefore, a manager of the automatic star sticker vending machine can profit from the star sticker issuance.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Figure 1:
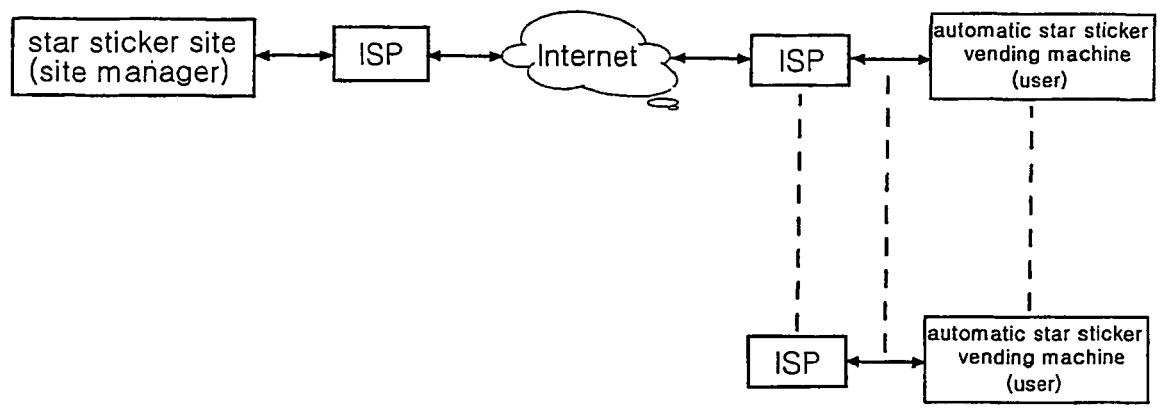
FIG. 1 is a block diagram schematically showing the construction of an automatic star sticker vending machine system in accordance with the present invention.

FIG. 1 is a block diagram schematically showing the construction of an automatic star sticker vending machine system in accordance with the present invention.

As shown in FIG. 1, the automatic star sticker vending machine system comprises a plurality of automatic star sticker vending machines for readily outputting updated newest star (an animation character, celebrity, popular person, performer, notable figure or the like) image photographs in the form of stickers, and a star sticker site for providing newest photographs of stars and data associated therewith, for example, data about latest news and movements and recent conditions and activities of the stars to the automatic star sticker vending machines online in real time over the Internet (Internet networks). The sticker vending machine system further comprises a site manager and an Internet service provider (ISP).

The Internet networks preferably include a variety of wired/wireless communication networks or satellite communication networks connectable to the Internet.

One or more automatic star sticker vending machines are installed in a distributed manner in a plurality of indoor or outdoor public places, so that one of them nearest to a user can be used by the user. Each of the automatic star sticker vending machines includes a network connected online to the star sticker site for receiving newest star data from the Internet service provider in real time over the Internet or a communication network.

The user can register himself/herself as a nonpaying member of the star sticker site, access the sticker site using a client system or a specific automatic star sticker vending machine and receive a variety of services from the sticker site.

The user can gain access to and log in to the star sticker site using his/her own client system (computer system) or a client system of another person (or a PC room) and output star data from the star sticker site in the form of a star sticker or download it. Alternatively, the user may output the star data from the star sticker site in the form of the star sticker using a neighboring automatic star sticker vending machine.

Figure 6:
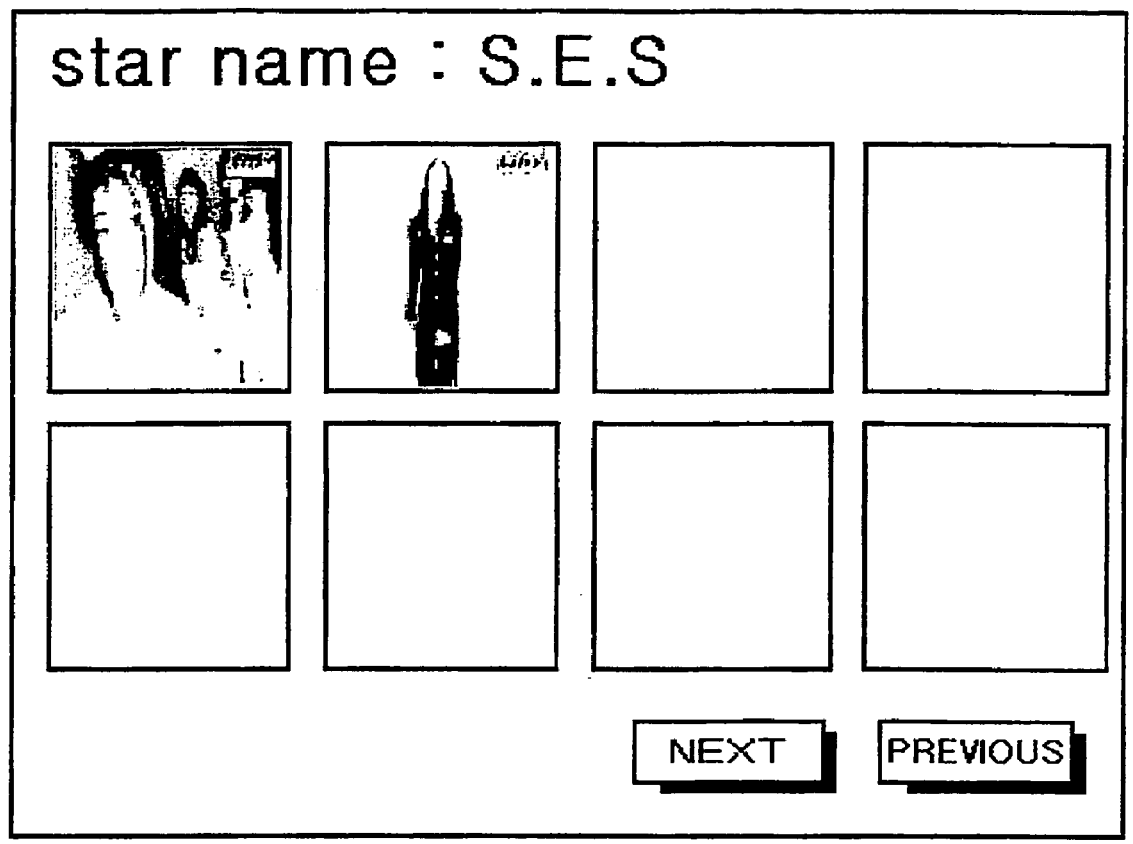
FIG. 6 is a view showing an example of an arrangement of star image photographs according to the present invention.

In other words, the user enters his/her ID and password through a touch screen of a specific automatic star sticker vending machine and logs in to the star sticker site. Thereafter, the user selects an image of one of a plurality of stars displayed on the touch screen of the automatic star sticker vending machine as shown in FIG. 6 or a desired one of a plurality of images of a selected star and outputs the selected image in the form of a star sticker in a color printing manner.

In the above procedure, alphabet characters and numerals necessary to the log-in process are displayed on the touch screen, and the user logs in by selectively touching the displayed alphabet characters and numerals.

The user registered as the member can output a limited (assigned) number of star stickers, preferably 2 to 5 star stickers in a day under a free condition. For this reason, in order to output star stickers of a number exceeding the limited number, the user has to pay a predetermined amount of money fixed to each of the star stickers.

Provided that the user is not the nonpaying member but a general user, he/she will have to pay a predetermined amount of money to receive a star sticker.

The user can pay money through the use of a coin mechanism or card reader installed in the automatic star sticker vending machine. The card reader is settlement means for cyber money or a readable/writable credit card for electronic settlement.

The cyber money may be cyber money saved (accumulated) by clicking banner advertisements on a homepage of the star sticker site of the present invention or cyber money saved through homepages of different sites. On the other hand, the user may pay a predetermined amount of money through the use of a cellular phone.

Figure 2:
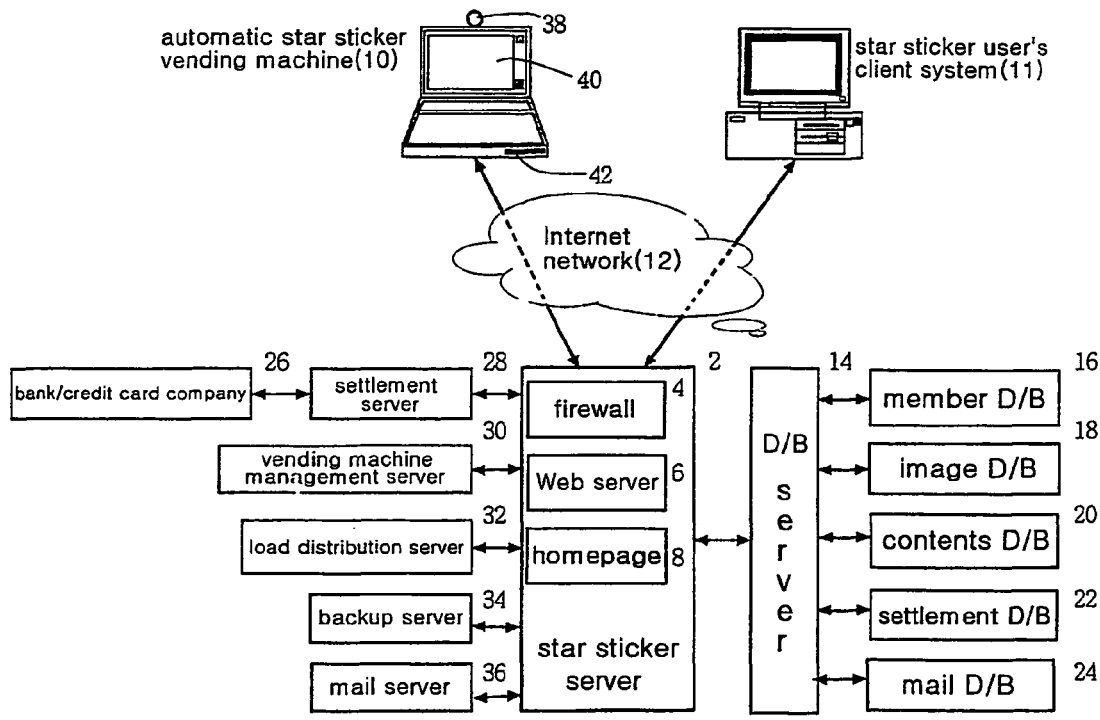
FIG. 2 is a block diagram of a star sticker site according to the present invention.

FIG. 2 is a block diagram of the star sticker site according to the present invention. As shown in this drawing, the star sticker site includes a star sticker server 2, which is a main server of the site. The star sticker server 2 includes a firewall 4, which is a security system, a Web server 6, a star sticker site homepage 8, and a DNS server. At least one user can gain access to the star sticker server 2 through an automatic star sticker vending machine 10 or client system 11 and an Internet network 12.

A database (D/B) server 14 is connected to the star sticker server 2. The D/B server 14 includes a member D/B 16 for storing member management data, an image D/B 18 for storing newest images and information (data) of stars introduced to the automatic star sticker vending machine 10, a contents D/B 20 for storing star sticker related data, various contents data and entertainment data, a settlement D/B 22 for storing settlement results and settlement related data, and a mail D/B 24 for providing an E-mail service to each member.

The D/Bs include storages connected to one another so as to be used in a proper manner. The storages are a kind of external memory units for storing data for a desired period of time and outputting the stored data as needed.

Also connected to the star sticker server 2 are a settlement server 28 which is connected to a bank/credit card company 26 for settlement of a fee for star sticker synthesis/output, a vending machine management server 30 which integratedly manages a plurality of distributed automatic star sticker vending machines 10, a load distribution server 32 which distributes traffic based on excessive accesses by users, a backup server 34 which protects the star sticker site from a data loss or hacking, and a mail server 36 which transfers E-mails between the users and a manager and between the users.

The D/B server 14 is preferably implemented with any one of a relational database management system (RDBMS), such as Oracle, Informix, Sybase or DB2, an object-oriented database management system (OODBMS), such as Gemstone or Orion, and a real-time database management system (DBMS).

The star sticker server 2 includes a program (for example, Active Server Page) implemented in ASP, PHP, JSP or other language. This program is run to manage and control a variety of databases on the star sticker site and send data to a user browser over the Internet. The star sticker server 2 further includes a server Web program for site management, and a member registration program for member registration.

The firewall 4 is installed between an external network, such as the Internet, and an internal network of the star sticker site to sense an intruder from the external network to the internal network, and to protect various data and resources from the intruder. The Web server 6 acts to send lists of various data disclosed in a bulletin board or reference library, settlement data and settlement associated details to the automatic star sticker vending machine system and user browser over an Internet protocol, and store the resulting data fed back from the vending machine system and user browser in a database.

The Web server 6 is preferably implemented with a typical Web server program different according to an operating system (OS) such as Windows series, SQL, Linux, Unix, Macintosh or the like. The Web server 6 further includes a series of application programs executable thereon, as well as the typical Web server program.

The member D/B 16 includes a field for storing personal information of each member, such as a member identification code, contact information, an E-mail address, financial information, an ID and a password. The member D/B 16 may be applied to non-members although it is preferred that a member registration system is provided in consideration of safety of settlement and overall convenience of use.

The settlement server 28 includes a billing machine for performing a billing operation including a calculation function and a recording function. The settlement server 28 is preferably implemented with a layer level-encryption system, such as an SET (Secure Electronic Transaction) protocol or SSL (Secure Socket Layer) protocol, or a PKI (Public Key Infrastructure)-based encryption system to maintain security and prevent hacking during settlement over the Internet or network.

On the other hand, the bank/credit card company 26 settles a user's account for a fee for star sticker output in response to the user's request (electronic settlement or credit card settlement through the client system, or settlement through the card terminal of the automatic star sticker vending machine).

In response to a settlement request from the user, the settlement server 28 sends settlement data to a terminal affiliated with the bank/credit card company 26, receives settlement approval data from the affiliated terminal and then pays the star sticker output fee.

Techniques associated with the above settlement method are well known in the art and a detailed description thereof will thus be omitted.

The contents D/B 20 stores data associated with users' interests, data about latest news and movements and recent conditions and activities of stars, reference data, life data and various entertainment data.

The contents and entertainment data are always updated with newest ones to provide active services to users so as to meet their various requirements.

Figure 3:
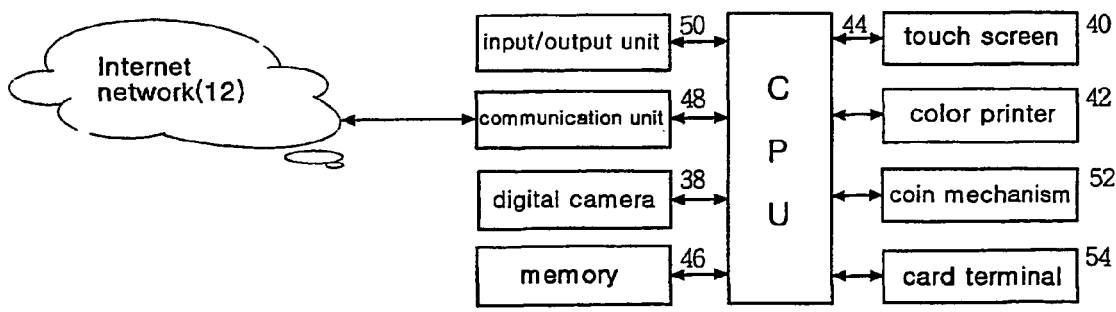
FIG. 3 is a block diagram of an automatic star sticker vending machine according to the present invention.

FIG. 3 is a block diagram of the automatic star sticker vending machine 10 according to the present invention. As shown in this drawing, the sticker vending machine 10 includes a central processing unit (CPU) 44 for controlling the entire operation of the sticker vending machine 10, a memory 46 for storing various programs and data, a touch screen 40 for performing a display function and input/output functions, a color printer 42 for outputting a synthesized/edited or non-synthesized/edited sticker in a color (or black-and-white) printing manner, a digital camera (or PC camera) 38 for picking up an image of a user on the spot, a communication unit 48 for exchanging real-time data with the star sticker server 2 online, a coin mechanism 52 for receiving coins or paper money for direct settlement of a fee for star sticker output under a pay condition, a card terminal 54 for settlement for a credit card or cyber money, and an input/output unit (input/output interface) 50 connected to external auxiliary storage units and peripheral devices.

The memory 46, touch screen 40, color printer 42, digital camera 38, communication unit 48, coin mechanism 52, card terminal 54 and input/output unit 50 are connected respectively to the central processing unit 44 to receive corresponding commands therefrom. The digital camera 38 is installed at an upper portion or predetermined portion of the automatic star sticker vending machine at such a position and angle that it can optimally take a face image of a user on the spot.

The input/output unit 50 of the automatic star sticker vending machine 10 are connected to storage units (for example, a CD-ROM driver, a hard disk and other external storage units) or various devices to enable a manager to repair/inspect failures of the star sticker vending machine 10 or update information thereof.

The automatic star sticker vending machine 10 is installed in an indoor or outdoor place or a public place so that it can be easily used by users. The sticker vending machine 10 also has simple functions, usage and edit level is so that it can be easily accessed and simply and conveniently used under a free condition, at a low cost or for actual expenses by users including ones having no expert knowledge. Therefore, the sticker vending machine 10 can meet users' various desires and further make a closer connection between stars and ordinary persons.

Also, the automatic star sticker vending machine 10 is standardized and automated to readily edit and output desired star images, thereby enabling even nonexperts to easily access the sticker vending machine 10 and output star stickers there through.

Each of the automatic star sticker vending machine 10 and client system 11 basically has an Internet accessible Web browser, an operating program, a communication program, a central processing unit, a communication unit (communication means), such as a modem, a LAN card (Ethernet) or the like, connected to the Internet in a wired/wireless manner over at least one of an ISDN, ADSL, HDSL, VDSL, a satellite communication network using a communication satellite, and a wireless communication network using a cellular phone, and application programs for executing multimedia functions.

The client system 11 constructs a library in the form of a database and stores therein image pose data, image background data, image effect data (various filters, noise, mosaic, rendering, etc.), image filtering data, image synthesis data, full or partial image emphasis data, image light and darkness or color depth adjustment data, character data (including special character data), numerical data, graphic data, clip art data and so forth. The client system 11 can edit newest star photographs in various forms on the basis of such data including the clip art data and output the edited photographs in the form of stickers by means of a printer. A dedicated/ universal program capable of processing images or graphics is used as a graphic edit program for inputting/outputting and synthesizing/editing newest star images.

The synthesized/edited star sticker images are stored in storage spaces of the star sticker site assigned respectively to members, or downloaded to the star sticker client system 11 and stored in an internal storage unit thereof or in external storage means through an input/output unit. A user can send the synthesized/edited star sticker images to his/her E-mail address through the use of the automatic star sticker vending machine system and download them to his/her client system. Also, the user can store the downloaded data in a temporary storage space and delete some or all of the stored data at any time if it is no longer necessary.

As well as the star sticker client system 11, the automatic star sticker vending machine 10 can synthesize/output a star's photograph with a member's photograph or digital information uploaded to an assigned space of the star sticker site by each member.

The color printer is shown as an example of the sticker output device connected to the output unit of each of the automatic star sticker vending machine 10 and star sticker client system 11. Alternatively, an image output device, such as a laser printer, inkjet printer, X-Y plotter and photograph output unit, may be connected to the output unit of each of the automatic star sticker vending machine 10 and star sticker client system 11 so as to output star image photographs and graphics synthesized/edited by users in color/ black-and-white in the form of stickers.

An open network which can be easily used by all unspecified ordinary persons, such as the Internet and an intranet, is preferably employed as a network connection channel between the automatic star sticker vending machine 10 and the star sticker site.

On the other hand, users can register themselves as members of the star sticker site through the following procedure. Namely, if a specific user gains access to the star sticker site through the use of his/her client system 11 and communication means, then a member registration picture is displayed on a screen of the client system 11 according to a member registration program. The specific user reads and recognizes a member registration agreement and enters member registration associated data, such as a name, address, resident registration number, telephone number, ID and password, according to a predetermined procedure. If the user is registered as a member of the star sticker site, then he/she can receive various benefits as the site member.

In the case where a user accesses the star sticker site homepage through his/her client system 11 or the automatic star sticker vending machine 10 with the communication unit after being registered as a member of the star sticker site, he/she must be authenticated as a member to receive various services from the star sticker site. If the user is authenticated as a site member, then he/she can select a variety of star photographs registered in the star sticker site and output the selected star photographs in the form of stickers, or use attendant services such as various contents and an entertainment bulletin board.

In the present invention, a user can use a search function when having difficulty or trouble in finding a desired one of contents data registered in a reference library. That is, the user searches for desired contents data on the basis of a writer, title, text, data name, file name, data provider name, index or the like, and selects and utilizes the desired contents data from a list of search results.

Preferably, a point saving system based on the use of the automatic star sticker vending machine is applied to the present invention. As a result, in proportion to the number of image outputs under a pay condition, a sticker output fee can be reduced or a predetermined number of stickers can be outputted under a free condition, thereby activating the sticker edit/output service based on the automatic star sticker vending machine 11.

On the other hand, in the case where the automatic star sticker vending machine 10 is located in a specific place with no connection to the Internet, storage means having data (information) about many stars stored therein, such as a CD-ROM title, hard disk, Zip driver or memory module, is connected to the input/output unit (input/output interface) of the sticker vending machine 10, and the data stored therein is updated with newest data. Therefore, the star data of the automatic star sticker vending machine 10 can be updated with newest star data although the machine is in an offline state.

In this case, it is of course necessary to continuously update star sticker photographs with newest ones.

Figure 7:
FIG. 7 is a front view showing an example of star stickers with advertisements according to the present invention.
Figure 8:
FIG. 8 is a front view showing an example of star stickers with synthesized star/user images and advertisements according to the present invention.

For the issuance of stickers under the free condition, advertisements of companies or individuals are inserted in certain portions of the stickers as shown in FIGS. 7 and 8 so that a manager of the star sticker site can profit from the star sticker issuance.

As needed, star stickers with only star images may be outputted as shown in FIG. 7, or star stickers with synthesized and edited user/star images may be outputted (issued) as shown in FIG. 8.

For the issuance of a star sticker with a synthesized/edited user/star image, a user uses his/her image previously registered in the star sticker site. Alternatively, if the user has no his/her image previously registered in the star sticker site, he/she may take a photograph of his/her image by the digital camera 38 installed in the automatic star sticker vending machine 10, synthesize the taken image photograph with a selected star image photograph and output the synthesis result in the form of a star sticker.

Figure 9:
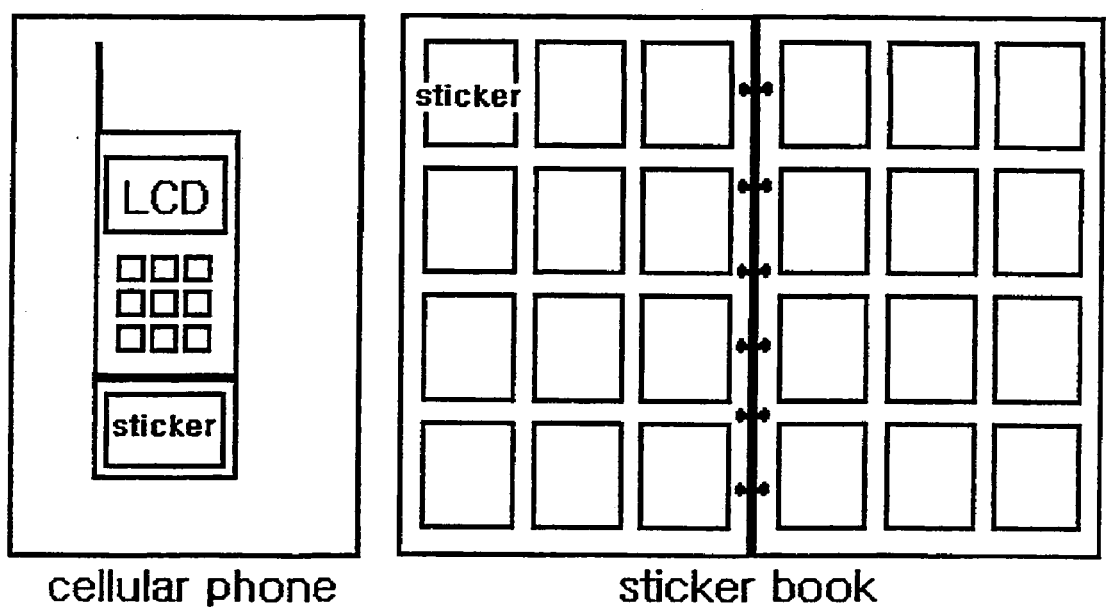
FIG. 9 is a view illustrating an example of used states of star stickers according to the present invention.

When a star sticker is issued, an object to which it is to be attached can be designated as shown in FIG. 9. For example, a star sticker may be issued for use on a cellular phone or in a sticker book.

In the case of sticker books, a promotional event may be conducted to offer various benefits to users each having a predetermined number of sticker books collected, so as to promote the use of the automatic star sticker vending machine 10.

In case of a promotional event, a user with a predetermined number of sticker books may receive premiums such as a large-size photograph, or framed picture, of his/her favorite star, a movie ticket, or the like.

Alternatively, a user may access the star sticker site through the general client system 11, not the automatic star sticker vending machine 10, to receive a star sticker photograph.

In other words, in a place where the automatic star sticker vending machine 10 is connected to the star sticker site over the Internet, a user can select a photograph of his/her favorite star and output a star sticker of the selected photograph through the color printer 42, as shown in FIG. 6.

Further, for the issuance of star stickers under the free condition, advertisements can be inserted in certain portions of the star stickers as shown in FIGS. 7 and 8.

Furthermore, a user can synthesize his/her photograph with a star's photograph and output the synthesis result in the form of a star sticker, as shown in FIG. 8. In this case, the user can download his/her photograph prestored in the star sticker site or take it by the digital camera 38 installed in the automatic star sticker vending machine 10 on the spot.

Figure 4:
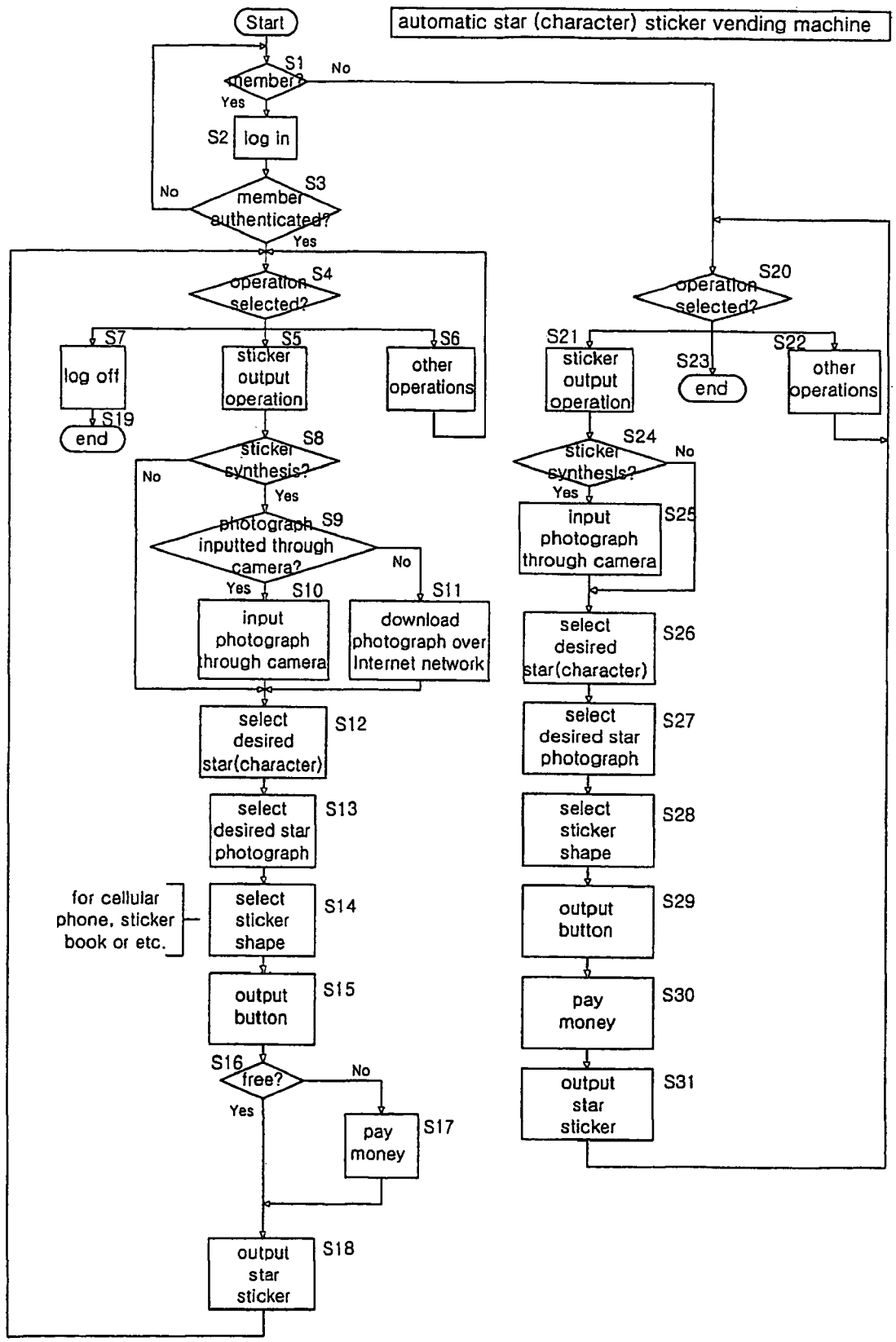
FIG. 4 is a flow chart illustrating the operation of the automatic star sticker vending machine system in accordance with a preferred embodiment of the present invention.

FIG. 4 is a flow chart illustrating the operation of the automatic star sticker vending machine system in accordance with a preferred embodiment of the present invention, wherein star stickers are outputted through the use of the automatic star sticker vending machine 10.

First, if a user is a member of the star sticker site (step S1), he/she logs in by entering his/her ID and password in an ID/password entry mode (step S2). If the user is authenticated as a member of the star sticker site through a member authentication procedure (step S3), then he/she selects a desired operation (step S4) to perform a sticker output operation (step S5), other operations (step S6) or a log-off operation (step S7). In the case where the user fails to be authenticated as a member of the star sticker site, the vending machine system outputs a log-in error message and returns to the ID/password entry mode to perform the member authentication procedure again.

In the other operations performed at step S6, the user can use various contents data provided from the contents D/B 20 of the star sticker site, for example, data associated with the user's interests, data about latest news and movements and recent conditions and activities of stars, reference data, life data and various entertainment data.

The contents and entertainment data are always updated with newest ones over the Internet to provide active services to the user so as to meet his/her various requirements.

The vending machine system may be changed from the other operations (step S6) to the sticker output operation (step S5) according to the user's selection.

On the other hand, the sticker output operation (step S5) may be roughly classified into, for example, two procedures, outputting a sticker with only a star photograph and outputting a sticker with a synthesized star/user photograph.

In the case where the user desires to output only a star photograph without synthesizing it with his/her photograph at a sticker synthesis selection step S8, the sticker output operation proceeds to a star/character selection step S12. Alternatively, if the user desires to synthesize a star photograph with his/her photograph at the sticker synthesis selection step S8, the sticker output operation moves to a photograph input step S9.

In the case where the user has no his/her digitalized photograph (image file) at the photograph input step S9, he/she can take a photograph of his/her image by the digital camera 38 installed in the automatic star sticker vending machine 10. If the user's photograph is taken by the digital camera 38, then it is automatically inputted to the vending machine system according to an edit program (step S10). Unless the user inputs his/her photograph through the digital camera 38, he/she downloads his/her photograph (image file) stored in the star sticker site via the communication unit 48 of the automatic star sticker vending machine 10 connected to the Internet network 12. As an alternative, the user may download his/her photograph stored in a cyber storage space of a specific site with the help (service) of the star sticker site homepage (step S11).

That is, at step S11, the user downloads data previously uploaded, for example, a photograph prestored in a storage space of the star sticker site assigned to each member via the communication unit 48 of the automatic star sticker vending machine 10. Or, the user may download a photograph stored in a cyber hard disk or cyber space of a specific site with the help (service) of the star sticker site homepage. This can remove the inconvenience of carrying a data storage unit and in turn prevent a loss thereof and damage to image data therein.

On the other hand, if the user selects a favorite or desired star or character or a desired star character under the condition that his/her photograph is taken (step S12), a plurality of photographs of the selected star or character are displayed while being arranged together with a name of the selected star or character, as shown in FIG. 6. A Next button and Previous button are provided so that the user can turn pages forward and backward when the plurality of photographs exceed a number displayable on one page.

In the case where the user selects the star/user photograph synthesis, a space is formed in a certain portion (left-hand side or right-hand side of the star or beneath or above the star) of each of the arranged star photographs with various poses and colors, and the user's photograph is then inserted in each of the formed spaces by way of a photograph synthesis program.

The synthesized star/user photographs are arranged in the order of their size and color according to the photograph synthesis program and a preferred one thereof is selected by the user (step S13). Thereafter, the user selects a sticker shape for use with, for example, a cellular phone, accessory, doll, key ring, favorite article, sticker book or the like (step S14).

If the user pushes an output button on the screen after selecting the star photograph and sticker shape (step S15), a determination is made as to whether the sticker output operation is under a free condition (step S16). In the case where the sticker output operation is under the free condition, a limited number of star stickers assigned to the user are outputted through the color printer 42 (step S18). On the contrary, if the sticker output operation is under a pay condition, namely, if the user desires to output star stickers of a number exceeding the limited number or does not want to insert advertisements of companies or individuals in the star stickers in compensation for the free condition, the user pays a predetermined amount of money (step S17), so the star stickers are outputted as shown in FIG. 10 (step S18).

As a result, star stickers with only star or character images are outputted as shown in FIG. 7, or star stickers with synthesized user/star or character images are outputted as shown in FIG. 8.

Figure 10:
FIG. 10 is a front view showing an example of star stickers with no advertisements according to the present invention.
Figure 10:
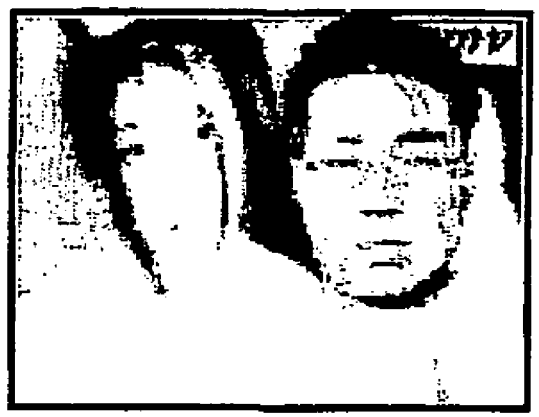

Also, advertisements of companies or individuals are inserted in certain portions of star stickers under the free condition as shown in FIGS. 7 and 8, or no advertisements are inserted in star stickers under the pay condition as shown in FIG. 10.

In the case where the sticker output operation is under the pay condition, the user has to insert a predetermined amount of coins or paper money into the coin mechanism 52 installed in the automatic star sticker vending machine 10 or pay a predetermined amount of money through the use of the terminal 54 for a readable/writable credit card (or cyber money) for electronic settlement, installed in the machine. Or, the user may pay a certain amount of his/her cyber money saved in a different site with the help (service) of the star sticker site homepage.

The user can output a limited or assigned number of star stickers, preferably 2 to 5 star stickers under the free condition in compensation for insertion of advertisements of companies or individuals in the star stickers, as shown in FIGS. 7 and 8. Provided that the user is a very important customer, he/she will be able to output a larger number of star stickers under the free condition. This member management data is stored/managed in the member D/B 16 of the star sticker site.

In the case where the sticker output operation is under the free condition, star stickers are outputted through the color printer 42 of the automatic star sticker vending machine 10 (step S18). The outputted star stickers are attached to, for example, a cellular phone, accessory, doll, key ring, favorite article, sticker book or the like according to their purposes for use, as shown in FIG. 9.

In the case where star stickers to be outputted under the free condition remain or the user desires to output a new or different star/character photograph even through there is no star sticker to be outputted under the free condition, the vending machine system returns to the operation selection step S4 to output stickers through the above steps.

If the user desires to end the sticker output operation, the vending machine system returns to the operation selection step S4, performs the log-off operation (step S7) and then ends the sticker output operation (step S19). These usage records are stored and managed in the member D/B 16.

On the other hand, if the user is a non-member of the star sticker site, the member authentication procedure is omitted. In this case, the vending machine system proceeds directly to an operation selection step S20 to perform an operation selected by the user under the pay condition.

Like a site member, the user selects a desired operation (step S20) to perform a sticker output operation (step S21), other operations (step S22) or a log-off operation (step S23).

In the other operations performed at step S22, the user can use various contents data provided from the contents D/B 20 of the star sticker site, for example, data associated with the user's interests, data about latest news and movements and recent conditions and activities of stars, reference data, life data and various entertainment data.

The contents and entertainment data are always updated with newest ones over the Internet to provide active services to the user so as to meet his/her various requirements. The vending machine system may be changed from the other operations (step S22) to the sticker output operation (step S21) according to the user's selection.

The sticker output operation (step S21) is performed in a somewhat different manner from that for a site member.

Namely, a non-member has no storage space assigned thereto, whereas a member is assigned a storage space capable of storing his/her photograph. For this reason, the user will input his/her photograph through the digital camera 38 installed in the automatic star sticker vending machine 10, synthesize it with a star photograph and output the synthesis result in the form of a sticker.

The sticker output operation (step S21) may be roughly classified into, for example, two procedures, outputting a sticker with only a star photograph and outputting a sticker with a synthesized star/user photograph.

In the case where the user desires to output only a star photograph without synthesizing it with his/her photograph at a sticker synthesis selection step S24, the sticker output operation proceeds to a star/character selection step S26. Alternatively, if the user desires to synthesize a star photograph with his/her photograph at the sticker synthesis selection step S24, the sticker output operation moves to a photograph input step S25 based on the digital camera 38 installed in the automatic star sticker vending machine 10. If the user's photograph is taken by the digital camera 38, then it is automatically inputted to the vending machine system according to a graphic edit program (step S25).

On the other hand, if the user selects a favorite or desired star or character or a desired star character under the condition that his/her photograph is taken (step S26), a plurality of photographs of the selected star or character are displayed while being arranged together with a name of the selected star or character, as shown in FIG. 6. When the plurality of photographs exceed a number displayable on one page, the user can turn pages forward and backward using the Next button and Previous button.

The user selects a desired star/character photograph while turning pages forward and backward (step S27), and then selects a sticker shape for use with, for example, a cellular phone, accessory, doll, key ring, favorite article, sticker book or the like (step S28).

If the user pushes the output button on the screen after selecting the star/character photograph and sticker shape (step S29) and pays a predetermined amount of money for sticker output (step S30), then star stickers as shown in FIG. 10 are outputted through the color printer 42 (step S31). The outputted star stickers are attached to, for example, a cellular phone, accessory, doll, key ring, favorite article, sticker book or the like according to their purposes for use, as shown in FIG. 9.

A star sticker with the left photograph of FIG. 10 is outputted when only a star or character photograph is selected, and a star sticker with the right photograph of FIG. 10 is outputted when a synthesized star/user photograph is selected.

In this case, advertisements of companies or individuals as shown in FIG. 8 are omitted because star stickers are outputted under the pay condition.

Because the sticker output operation is under the pay condition, the user as a non-member must pay a predetermined amount of money through the coin mechanism 52 or the credit card or cyber money terminal 54 installed in the automatic star sticker vending machine 10. Alternatively, the user may pay a certain amount of his/her cyber money saved in a different site with the help (service) of the star sticker site homepage.

In the case where the user as a non-member desires to output a new or different star photograph under the pay condition, the vending machine system returns to the operation selection step S20 to output stickers through the above steps.

If the user desires to end the sticker output operation, the vending machine system returns to the operation selection step S20 and then ends the sticker output operation (step S23).

Figure 5:
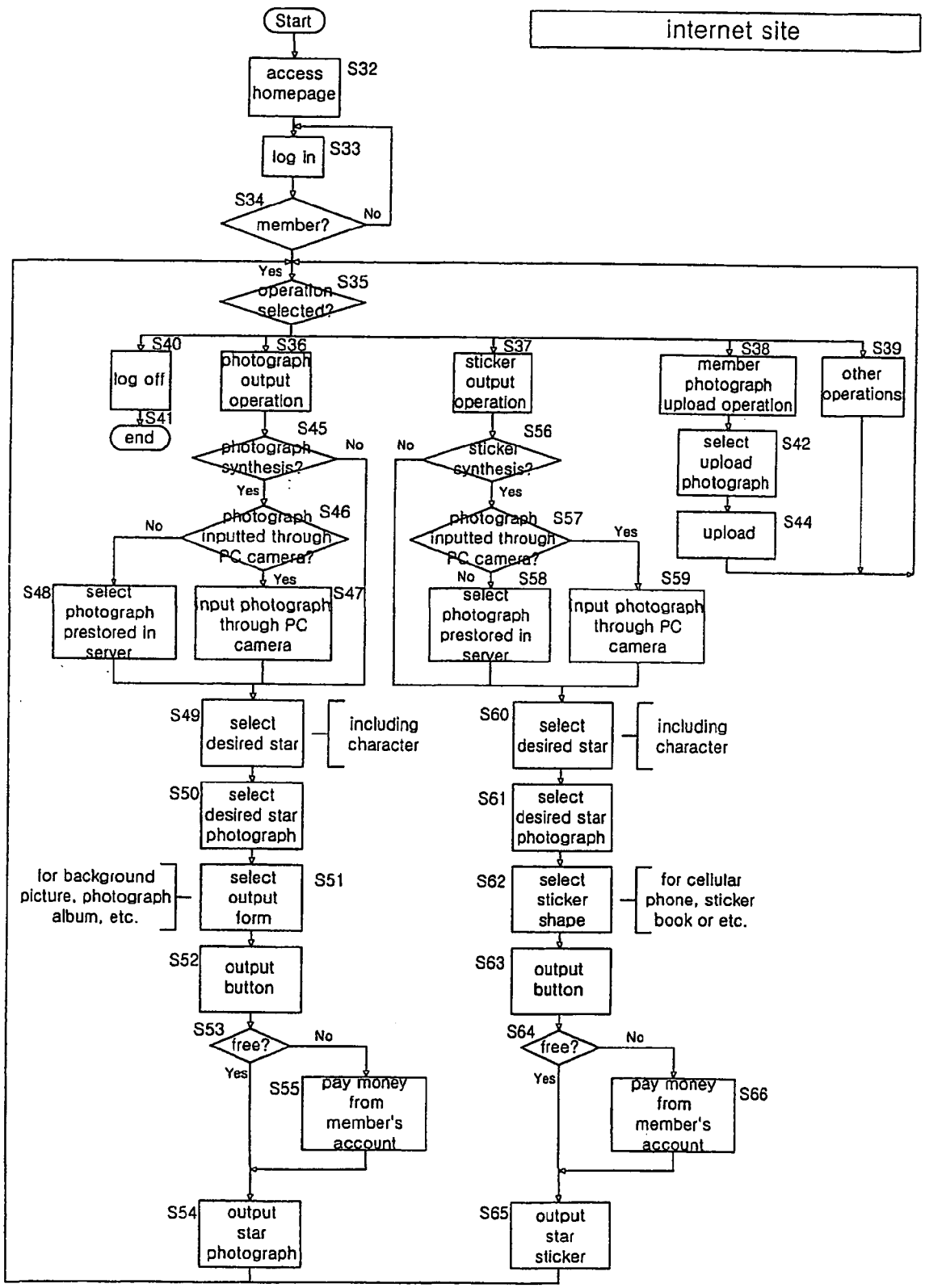
FIG. 5 is a flow chart illustrating the operation of the automatic star sticker vending machine system in accordance with an alternative embodiment of the present invention.

FIG. 5 is a flow chart illustrating the operation of the automatic star sticker vending machine system in accordance with an alternative embodiment of the present invention, wherein a user synthesizes/edits and outputs star stickers through the use of his/her client system, another person's client system or a public client system, not the automatic star sticker vending machine 10.

First, if the user is a non-member of the star sticker site, he/she gains access to the star sticker site through the client system 11 and Internet network 12, recognizes a member registration agreement and then enters an ID and password to register himself/herself as a member of the star sticker site.

If the user is registered as a member of the star sticker site, then he/she accesses the star sticker site homepage (step S32), and logs in by entering his/her ID and password in an ID/password entry mode (step S33). If the user is authenticated as a member of the star sticker site through a member authentication procedure (step S34), then he/she selects a desired operation (step S35). In the case where the user fails to be authenticated as a member of the star sticker site, the vending machine system outputs a log-in error message and returns to the ID/password entry mode to perform the member authentication procedure again.

At the operation selection step S35, the user can select any one of a photograph output operation (step S36), a sticker output operation (step S37), a member photograph upload operation (step S38), other operations (step S39) or log-off and end operations (step S40 and step S41).

In the member photograph upload operation (step S38) of the operation selection step S35, the user selects his/her photograph to be uploaded (step S42) and uploads the selected photograph to a cyber storage space of the star sticker site assigned to the user (step S44). The uploaded user photograph is stored in the assigned cyber storage space so that it can be used later for synthesis with a star photograph.

In the other operations performed at step S39, the user can use various contents data provided from the contents D/B 20 of the star sticker site, for example, data associated with the user's interests, data about latest news and movements and recent conditions and activities of stars, reference data, life data and various entertainment data. The contents and entertainment data are always updated with newest ones over the Internet to provide active services to the user so as to meet his/her various requirements.

After completing the other operations (step S39), the vending machine system may move to the log-off and end operations (step S40 and step S41) or a different operation.

In the photograph output operation (step S36), a star photograph is printed on a general paper or sticker paper, or stored in a hard disk of the client system in the form of a file for a background picture of a monitor or a file for an electronic album. A photograph synthesis or non-synthesis is selected at step S45. If the photograph non-synthesis is selected, then the vending machine system moves directly to a desired star selection step S49.

In the case where the photograph synthesis is selected, the user selects a PC camera connected to the client system 11 or the star sticker server (step S46). As a result, the user inputs his/her photograph through the PC camera connected to the client system 11 (step S47) or selects his/her photograph prestored in the server (step S48), and then selects a desired star (step S49).

If a plurality of photographs of the selected star are arranged on a screen of the monitor, the user selects a desired one of the arranged star photographs (step S50) and then a desired output form, for example, a background picture, photograph album or electronic album (step S51). Thereafter, if the user pushes an output button (step S52), a determination is made as to whether the photograph output operation is under the free or pay condition (step S53). In the case where the photograph output operation is under the free condition, the selected star photograph is outputted in the selected output form without performing settlement and authentication procedures (step S54).

On the other hand, if the user desires to output the selected star photograph under the condition that a predetermined number of photographs assigned thereto under the free condition have already been outputted, he/she can output the selected star photograph in the selected output form (step S54) by paying a predetermined amount of money from his/her account (step S55).

At step S54, the selected star photograph is printed on a general paper or sticker paper, or stored in a hard disk of the client system in the form of a file for a background picture of the monitor or a file for an electronic album.

After outputting the selected star photograph in the selected output form (step S54), the vending machine system returns to the operation selection step S35 to perform a different operation or the log-off and end operations (step S40 and step S41).

In the sticker output operation (step S37), the user may desire or not to synthesize his/her photograph with a star photograph (step S56). If the user does not desire to synthesize his/her photograph with a star photograph, he/she can select a desired star directly (step S60).

In the case where the user desires to synthesize his/her photograph with a star photograph, he/she can select the PC camera connected to the client system 11 or the star sticker server (step S57). As a result, the user inputs his/her photograph through the PC camera connected to the client system 11 (step S59) or selects his/her photograph prestored in the server (step S58), and then selects a desired one of several stars displayed on the screen (step S60). If a plurality of synthesized photographs of the selected star's photographs and the user's photograph are arranged on the screen, the user selects a desired one of the arranged photographs according to his/her tastes (step S61) and then a sticker shape for use with, for example, a cellular phone, accessory, doll, key ring, favorite article, sticker book or the like (step S62).

Thereafter, if the user pushes the output button (step S63), a determination is made as to whether the sticker output operation is under the free or pay condition (step S64). In the case where the sticker output operation is under the free condition, a sticker with the synthesized star/user photograph selected by the user is outputted in the selected shape without performing settlement and authentication procedures (step S65).

On the other hand, if the user desires to output the sticker with the selected star/user photograph under the condition that a predetermined number of stickers assigned thereto under the free condition have already been outputted, he/she can output the sticker with the selected star/user photograph (step S65) by paying a predetermined amount of money from his/her account (step S66).

At step S65, the selected star/user photograph or image is printed on a general paper or sticker paper, or stored in a hard disk of the client system in the form of a file for a background picture of the monitor or a file for an electronic album. Subsequently, the vending machine system returns to the operation selection step S35 to perform a different operation or the log-off and end operations (step S40 and step S41).

According to the present invention, companies'/individuals' banner advertisements are provided as profit models on the star sticker site homepage or stickers.

As described above, star images in the automatic star sticker vending machine are updated with newest ones in real time over the Internet such that a user is provided with a newest image and information of his/her favorite star and outputs the newest image and information in the form of a sticker or downloads and stores them in the form of a file. Therefore, the user's various desires can be met and the user can be more familiar with the favorite star.

Furthermore, a predetermined number of stickers can be outputted under a free condition in compensation for provision of advertisements in certain portions thereof, thereby promoting the use of the automatic star sticker vending machine and increasing advertising effects to more easily inform users of companies' or individuals' images.

INDUSTRIAL APPLICABILITY

As apparent from the above description, the present invention provides an automatic star sticker vending machine and a method for updating information thereof, wherein images and information of stars (an animation character, celebrity, popular person, performer, notable figure or the like) in the star sticker vending machine desired by a user are updated with newest ones in real time over the Internet such that the user synthesizes a newest image (photograph file) of his/her favorite star, his/her image (photograph) and a desired image and outputs the synthesized result in the form of a sticker or downloads and stores it into a storage medium in the form of a file. Therefore, the user's various desires can be met and the user (fan) can be more familiar with the favorite star.

Moreover, a predetermined number of stickers can be outputted under a free condition in compensation for provision of advertisements in certain portions thereof, thereby promoting the use of the automatic star sticker vending machine and increasing advertising effects to more easily inform users of companies' or individuals' images.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for updating information of an automatic star sticker vending machine which includes Internet communication means, image input means, image processing means, and a network connected to a star sticker site, said star sticker site updating star images with newest ones in real time, said method comprising the steps of:
   a) allowing a user to select a desired one of the star images updated in real time by said star sticker site through said automatic star sticker vending machine;
   b) synthesizing equivalently the selected star image with a user image without modification; and
   c) outputting the synthesized star/user image in the form of a star sticker.

2. The method as set forth in claim 1, further comprising the step of:
   d) inserting an advertisement in a predetermined portion of said star sticker to output said star sticker under a free condition.

3. A method for updating information of an automatic star sticker vending machine by accessing a star sticker site through a client/server system to provide newest image information to the star sticker vending machine, said client/server system including Internet communication means, image input means, image processing means and a processor, said method comprising the steps of:
   a) allowing a user to gain access to and log in to said star sticker site through a client system and to select a desired real-time-updated star image from said star sticker site;
   b) synthesizing equivalently the selected star image with a user image without modification; and
   c) outputting the synthesized star/user image in the form of a star sticker onto a printer of the client system.

4. The method as set forth in claim 3, further comprising the step of:
   d) inserting an advertisement in a predetermined portion of said star sticker to output said star sticker under a free condition.

5. An automatic star sticker vending machine system for providing newest information through a client/server system with Internet communication mean and a processor, comprising:
   a star sticker site for updating star images and information with newest ones in real time; and
   a plurality of automatic star sticker vending machines distributed in a plurality of places and each having a digital camera and a sticker output device, each of said star sticker vending machines being connected online to said star sticker site to output a star sticker with only a star image or a star sticker with a equivalent synthesized star/user image.

6. The automatic star sticker vending machine system as set forth in claim 5, wherein said star sticker site includes:
   a star sticker server accessed by at least one user through each of said automatic star sticker vending machines or a client system and an Internet network;
   a database server connected to said star sticker server;
   a settlement server connected to said star sticker server and a bank/credit card company for settlement of a fee for star sticker synthesis/output;
   a vending machine management server connected to said star sticker server for integratedly managing said automatic star sticker vending machines;
   a load distribution server connected to said star sticker server for distributing traffic based on excessive accesses by many users;
   a backup server connected to said star sticker server for protecting said star sticker site from a data loss or hacking; and
   a mail server connected to said star sticker server for transferring E-mails between the users and a manager and between the users.

7. The automatic star sticker vending machine system as set forth in claim 6, wherein said database server includes:
   a member database for storing member management data;
   an image database for storing newest images and information of stars introduced to said automatic star sticker vending machines;
   a contents database for storing star sticker related data, various contents data and entertainment data;
   a settlement database for storing settlement results and settlement related data; and
   a mail database for providing an E-mail service to each member.

8. The automatic star sticker vending machine system as set forth in claim 5, wherein each of said automatic star sticker vending machines includes:
   a central processing unit for controlling the entire operation of a corresponding one of said automatic star sticker vending machines;
   a memory connected to said central processing unit for storing various programs and data;
   a touch screen connected to said central processing unit for performing a display function and input/output functions;
   a color printer connected to said central processing unit for outputting a synthesized/edited or non-synthesized/edited sticker in a color printing manner;
   a digital camera connected to said central processing unit for picking up an image of a user on the spot;
   a communication unit connected to said central processing unit for exchanging real-time data with said star sticker server online; and
   a coin mechanism connected to said central processing unit for receiving coins or paper money for direct settlement of a fee for star sticker output under a pay condition.

* * * * *